United States Patent Office 3,530,097
Patented Sept. 22, 1970

---

3,530,097
PERHALOACETONE-EPOXIDE POLYMERS AND METHOD OF PREPARATION
Harry A. Smith, Midland, Mich., assignor to The Dow Chemical Company, Midland, Mich., a corporation of Delaware
No Drawing. Filed Nov. 12, 1968, Ser. No. 775,166
Int. Cl. C08g 15/00
U.S. Cl. 260—63
9 Claims

ABSTRACT OF THE DISCLOSURE

This invention is concerned with the use of alkali metal oxides as catalysts for the interpolymerization of perhaloacetones and epoxides to produce new polymer compositions. The use of such catalysts produces chain growth on both ends of the polymer to produce novel polymeric materials useful as structural materials, films, coatings and the like. Such new polymers have the general formula

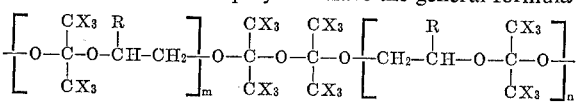

wherein X is chlorine or fluorine, R is hydrogen, an alkyl or an aryl radical having from 1 to 14 carbon atoms and $m$ and $n$ are integers greater than 0.

---

This invention relates to novel polymers and to catalysts for the preparation of such novel polymers. The invention more particularly relates to a new process for the preparation of interpolymers and perhaloacetone and alkylene oxides in the presence of an alkali metal oxide catalyst and to the polymers produced thereby.

The copolymerization of a perhaloacetone (such as hexafluoroacetone) and a lower alkylene oxide in the presence of a catalyst such as cesium fluoride is described in U.S. 3,316,216. Such process, however, produces polymers which increase in chain length by adding monomer units to only one end of the initiating perhaloacetone unit and thereby produce polymers represented by the formula

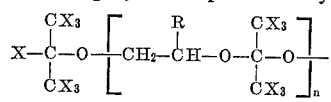

wherein X is hydrogen or a halogen and R is hydrogen or a hydrocarbon group of defined size and $n$ is an integer greater than 1.

It is an object of this invention to provide to the art new polymer compositions and a method for making such new polymer compositions. A further object is to provide to the art a new group of catalysts for preparing interpolymers of perhaloacetones and alkylene oxides. A still further object is to provide to the art a process for interpolymerizing a perhaloacetone with one or more alkylene oxides wherein polymer chain growth occurs on both ends of the polymer chain. These and other objects and advantages of the present invention will become apparent from a reading of the following detailed specification.

It has now been discovered that perhaloacetones and alkylene oxides may be polymerized in the presence of an alkali metal oxide catalyst to form interpolymers of such monomers. The unique feature of the alkali metal oxides as catalysts or initiators for this polymerization reaction is that during the polymerization step, chain length increases at both ends of the polymer chain rather than at only one end as is achieved with the known catalyst systems.

As used herein the term "alkali metal oxides" refers to oxides of the members of Group Ia of the Periodic Table, particularly the oxides of cesium, rubidium and potassium. Usually, however, cesium oxide is the preferred catalyst.

The term "halo" as used herein with reference to the ketone reactant is meant to include the chloro- and fluoro-substituents. Perhaloacetones suitable for use in the present invention include perfluoroacetone (hexafluoro acetone, perchloroacetone, hexachloroacetone) as well as mixed chloro- and fluoro-substituted perhalo-substituted acetones. Illustrative mixed perhalo-substituted acetones include dichlorotetrafluoroacetone, tetrachlorodifluoroacetone, monochlorophentafluoroacetone, tetrachloromonofluoroacetone and the like. Perfluoroacetone is a particularly desirable reactant in that it leads to highly fluorinated polymeric products.

Alkylene oxides suitable for use in this invention include aliphatic and aromatic alkylene oxides having from about 2 to about 16 carbon atoms, preferably from about 2 to about 8 carbons in the hydrocarbon chain e.g. 1,2-epoxyethane (ethylene oxide), 1,2-epoxypropane (propylene oxide), 1,2-epoxybutane (butylene oxide), cis and trans 2,3-epoxybutane, 1,2-epoxy-1-phenylethane (styrene oxide) and mixtures thereof.

According to the process of this invention, substantially anhydrous reactants are admixed in a reaction vessel with the alkali metal oxide catalyst. The proportions of perhaloacetone to alkylene oxide are not critical but in general a molar ratio of about 1:1 is preferred. Proportions of catalyst of from about 0.001 to about 5 percent by weight based on the perhaloacetone present may be employed but from about 0.01 to about 1.0 percent by weight is usually preferred. Below about 0.001 percent by weight of catalyst causes the reaction to be too slow to be practical and proportions greater than about 5.0 percent by weight tends to produce low molecular weight polymers.

After admixing the reactants and the catalyst, the polymerization reaction is conducted at a temperature of between about 0° C. and about 100° C., preferably between about 15° C. and 50° C. At temperatures below about 0° C., the polymerization is generally too slow and at temperatures above about 100° C. dioxalanes tend to be formed preferentially to the polymer. While the pressure during the polymerization is not critical, it usually is more convenient to conduct the polymerization under autogenous pressure. If desired the polymerization can be carried out in the presence of an inert solvent such as a hydrocarbon or chlorocarbon. The presence of any significant amount of water should be prevented during the polymerization as the presence of water greatly reduces the molecular weight of the polymer product.

The time required for polymerization to take place depends upon the monomers or reactants employed, the temperature during the polymerization step and the concentration of catalyst employed. In general, however, a time of at least 4 hours is required to achieve an acceptable yield of polymer and polymerization times of 1000 hours or more may be employed.

After polymerization, the product is removed from the reaction vessel and purified by stripping or by solvent extraction to remove any unreacted monomers or low molecular weight materials therefrom.

The resulting perhaloacetone-alkylene oxide polymers have the structure

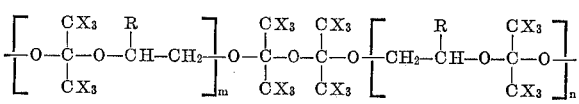

and are substantially insoluble in a wide variety of conventional solvent materials, e.g. mineral acids, such as concentrated sulfuric acid, inorganic bases such as aqueous sodium hydroxide, dimethyl sulfoxide, dimethyl formamide, water, and the like. Solubility of such polymers will depend to some extent, however, on the particular alkylene oxides employed and on the molecular weight of the polymer. These polymers find structural uses but are particularly suitable as protective films for the surface coating of metals, glass, ceramics, plastics, wood and the like.

The following examples will serve to further illustrate the present invention but are not to be construed as limiting to the scope thereof.

EXAMPLE 1

To a dried glass reactor was added 0.0282 g. ($2 \times 10^{-4}$ equivalents) of cesium oxide, 3.32 g. of hexafluoroacetone and 1.16 g. of propylene oxide. The reactor was sealed, heated as necessary, and agitated for the required time. At the end of the reaction time, the reactor was opened, the product removed and the excess reactants removed by vaporization under vacuum. The results are shown in the following table:

| Temp., °C. | Polymer yield, wt. percent | Number average molecular wt. | |
|---|---|---|---|
| | | Calculated | Found |
| Time, hours: | | | |
| 16 | 23 | 67 | 10,800 | 21,500 |
| 24 | 23 | 79 | 11,000 | 24,000 |
| 8 | 50 | 48.5 | 8,700 | 17,100 |
| 16 | 50 | 62.0 | 9,700 | 19,300 |

The equation used to calculate number average molecular weight was as follows:

$$\overline{Mn} = \frac{\left(\frac{\text{wt. of polymer}}{\text{equiv. of initiator}}\right)}{\left(\frac{\text{wt. of alkylene oxides} \times H_2O \text{ content of alkylene oxide}}{\text{equiv. wt. of } H_2O \text{ equiv. of initiator}}\right)}$$

The fact that the $CS_2O$-initiated polymerization produced molecular weights twice that calculated by the usual calculation for one polymer chain per equivalent of initiator indicates that the mechanism of the polymerization employing $CS_2O$ produces one polymer chain per two equivalents of initiator leading to polymers of the structure:

$$\left[-O-\underset{\underset{CF_3}{|}}{\overset{\overset{CF_3}{|}}{C}}-O-\underset{}{\overset{\overset{CH_3}{|}}{C}}H-CH_2-\right]_m\left[-O-\underset{\underset{CF_3}{|}}{\overset{\overset{CF_3}{|}}{C}}-O-\underset{\underset{CF_3}{|}}{\overset{\overset{CF_3}{|}}{C}}-O-\right]\left[-CH_2-\underset{}{\overset{}{C}}H-O-\underset{\underset{CF_3}{|}}{\overset{\overset{CF_3}{|}}{C}}-O-\right]_n$$

This structure was additionally indicated by elemental analysis. Analysis likewise showed the resulting polymers to be OH or alkoxide terminated.

In a substantially identical reaction conducted, as a control, using cesium fluoride as the catalyst, the calculated number average molecular weight was 29,000 whereas the actual molecular weight was determined to be 29,500. This experiment demonstrated that the use of the known CsF as an initiator produces actual molecular weights substantially equivalent to the theoretical molecular weight calculated in accordance with the above formula and therefore having a structure represented by the formula

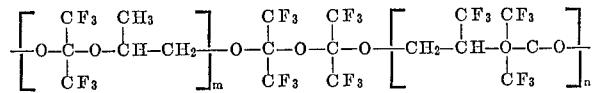

This structure was additionally identified by elemental analysis.

EXAMPLE 2

To a dried glass reactor containing 0.01 gm. ($7 \times 10^{-5}$ equivalents) of cesium oxide was added 26.2 gm. (0.158 mole) of hexafluoroacetone (H.F.A.), 10.4 gm. (0.236 mole) of ethylene oxide (E.O.) and 4.6 gm. (0.080 mole) of propylene oxide. The reactor was sealed, warmed to 50° C. and agitated for 19 hours by shaking. At the end of this period, the reactor was opened and the volatiles vented and removed by vacuum. The remaining polymer represented a yield of 52 wt. percent, had a melting range of 128–135° C. and a mole ratio composition of 50 H.F.A./28 E.O./22 P.O.

EXAMPLE 3

In the same manner as Example 2, equimolar proportions of ethylene oxide (E.O.) and propylene oxide (P.O.) were admixed with hexafluoroacetone (H.F.A.) in a mole ratio of 1 mole total alkylene oxide per 2.5 moles of H.F.A. After polymerization in the presence of cesium oxide at 50° C. under autogenous pressure for 19 hours, a yield of 54% was produced. The polymer had a melting range of 75 to 82° C. and a mole ratio composition of 50 H.F.A. to 3 E.O. to 47 P.O.

Similar results are obtained when rubidium oxide or potassium oxide are employed as the catalyst in the place of cesium oxide.

Various modifications can be made in the present invention without departing from the spirit or scope thereof for it is understood that I limit myself only as defined in the appended claims.

I claim:

1. A process for the polymerization of perhaloacetones with alkylene oxides which comprises contacting perhaloacetone with an alkylene oxide having from 2 to 16 carbon atoms in the presence of an alkali metal oxide catalyst in a proportion of from about 0.001 to about 5.0% by weight of the perhaloacetone at a temperature of between about 0° C. and about 100° C. for a time sufficient to produce polymerization.

2. The process of claim 1 wherein the alkali metal oxide catalyst is present in the reaction mixture in a proportion of from about 1.0 to about 5.0% by weight of the perhaloacetone.

3. The process of claim 1 wherein the reaction temperature is between about 15 and 50° C.

4. The process of claim 1 where the pressure during polymerization is autogenous pressure.

5. The process of claim 1 wherein the reaction time is at least 4 hours.

6. The process of claim 1 wherein the catalyst is cesium oxide, rubidium oxide or potassium oxide.

7. An interpolymer of perhaloacetone and one or more alkylene oxide consisting essentially of a polymer having the formula

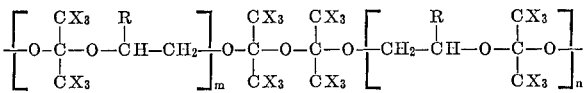

wherein X is chlorine or fluorine, R is independently selected from hydrogen, alkyl, alkenyl or aryl groups having from 1 to 14 carbon atoms and wherein $m$ and $n$ are integers greater than 0.

8. An interpolymer of claim 7 wherein the perhaloacetone is hexafluoroacetone and the epoxide monomer is propylene oxide.

9. The interpolymer of claim 7 wherein the epoxide monomer is a mixture of ethylene oxide and propylene oxide.

References Cited

UNITED STATES PATENTS 3,316,216  4/1967  Fawcett et al. _____ 260—63

WILLIAM H. SHORT, Primary Examiner

L. L. LEE, Assistant Examiner

U.S. Cl. X.R.

260—2, 615